Jan. 12, 1937.　　　A. URFER　　　2,067,467
METHOD OF AND MEANS FOR INDICATING RELATIVE ANGULAR MOVEMENTS
Filed July 28, 1930
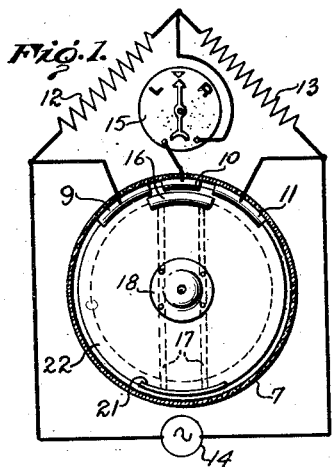
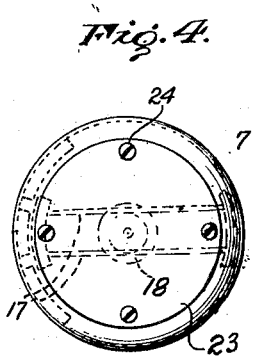
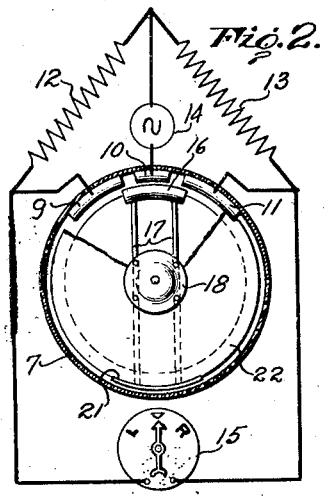
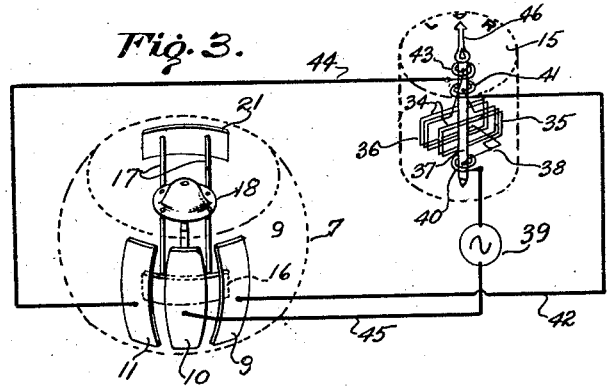
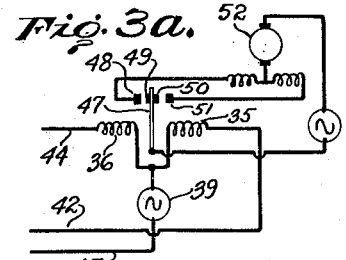
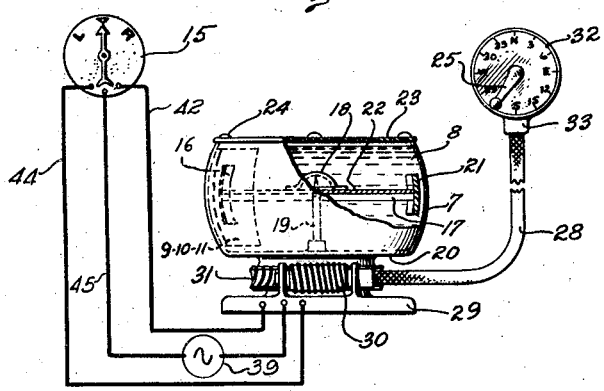
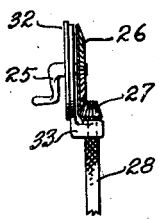
Inventor
Adolf Urfer
By F. B. Smith
Attorney Patented Jan. 12, 1937

2,067,467

UNITED STATES PATENT OFFICE 2,067,467

METHOD OF AND MEANS FOR INDICATING RELATIVE ANGULAR MOVEMENTS

Adolf Urfer, Richmond Hill, N. Y., assignor to Pioneer Instrument Company, Incorporated, Brooklyn, N. Y., a corporation of New York Application July 28, 1930, Serial No. 471,388

1 Claim. (Cl. 201—57)

The present invention relates to a method of and means for indicating relative angular movements between objects, and more particularly to a method of and means for indicating the deviation of a mobile object from a selected path or course.

One of the objects of the invention is to provide a novel method of indicating differences in the relative angular position between a directional device, such as a compass, and a mobile object, such as a ship or aircraft, on which said device is mounted.

Another object is to provide a novel method of indicating the deviation of a mobile object from a selected path or course which consists in maintaining a balance between a pair of electrical circuits when the mobile object is on said selected course, disturbing said balance when said mobile object deviates from said course by increasing the resistance of one of said circuits while decreasing that of the other, and indicating said unbalance.

Another object is to provide a novel electrolytic control system which is so designed as to depend for operation upon changes in the electrolytic resistance of an electrical circuit or circuits due to changes in the length of the electrolytic paths of said circuits.

Another object is to provide novel electrical apparatus of the above-mentioned type for varying the resistance of normally balanced electrolytic circuits whereby said circuits may be unbalanced in accordance with the relative angular movement between certain of the elements of said apparatus, and for indicating the magnitude and direction of said unbalance in accordance with the direction of said angular movement.

Another object is to provide novel electrical apparatus in combination with a directional element adapted to be carried by a mobile object, for increasing the resistance of one of a pair of balanced electrolytic circuits while decreasing the resistance of the other whereby said circuits may be unbalanced in accordance with relative angular movement between said directional element and said mobile object, and for indicating said unbalance, at a remote point, in accordance with the magnitude and direction of said angular movement.

Another object is to provide, in combination with a directional or controlling device such as a magnetic compass, novel electrical means for indicating differences in the relative angular position between the directional device and a mobile object, such as a ship or aircraft, on which said device is mounted.

Still another object of the invention is to provide, in combination with a magnetic compass, novel electrical means including an indicator or indicators, located at a distance from said compass, for indicating relative angular movement between the magnetic element of the compass and the mobile object on which said compass is mounted.

A still further object is to provide, in combination with a compass and novel electrical control apparatus therefor, means for predetermining and setting a course to be followed by the mobile object on which said compass is mounted and for indicating at a convenient point or points, which latter may be at a distance from the compass, angular deviations of said mobile object from the predetermined or selected course.

Other objects and advantages of the invention will appear more fully hereinafter from the following description taken together with the accompanying drawing, which illustrates various embodiments of the invention. It is to be expressly understood, however, that the drawing is for purposes of illustration and description only, and is not designed as a definition of the limits of the invention, reference being had for this purpose to the appended claim.

In the drawing, wherein like reference characters refer to like parts throughout the several views, Fig. 1 is a plan view, partially diagrammatic and partly in section, illustrating one embodiment of the invention;

Fig. 2 is a similar view, with parts broken away, illustrating another form of the embodiment of the invention shown in Fig. 1;

Fig. 3 is a perspective view of another embodiment;

Fig. 3ª is a modified circuit arrangement of the apparatus shown in Fig. 3;

Fig. 4 is a plan view of the directional device of the apparatus;

Fig. 5 is an elevation, partially diagrammatic, of one form of the course-setting mechanism together with the control device and deviation indicator, part of the control device being broken away; and Fig. 6 is a side elevation of a portion of the course-setting mechanism shown in Fig. 5.

It is known that in an electrical circuit which includes a pair of electrodes immersed in an electrolyte, the electrolytic resistance of the circuit may be varied by changing the path length between the conductors or electrodes and it is also known that in a Wheatstone bridge circuit no current flows in the arms of the bridge when they are balanced, that is, when the resistances of the two arms are equal. In Fig. 1 there is illustrated novel means for varying the length of the electrical path between a common electrode and a pair of electrodes adjacent said common electrode on each side thereof, whereby the resistance of the circuits including said electrodes is varied and the balance of the bridge disturbed.

As shown, 7 is a container of some suitable insulating material such as glass, porcelain, or hard rubber, preferably the latter, and having an electrolyte 8 therein, the latter, for example, being composed of distilled water slightly acidulated with hydrochloric acid, or other suitable electrolytic means. Carried by the container on one side thereof and immersed in the electrolyte 8 are electrodes 9, 10 and 11 arranged in spaced relation so that an electrolytic path is formed between the adjacent ends of each of the outside electrodes 9 and 11 and the common electrode 10. Electrodes or conductors 9, 10 and 11 may be of any suitable conducting material, preferably non-metallic, as for example, carbon, graphite, or some other allotropic form of carbon, and are arranged in a Wheatstone bridge circuit with equal external resistances 12 and 13 so that resistance 12 and the electrolytic path between conductors 9 and 10 form one arm of the bridge while resistance 13 and the electrolytic path between conductors 10 and 11 form the other arm of the bridge. The circuit is adapted to be energized from a source of electrical energy 14 which may be direct or alternating current, preferably the latter. A suitable indicating device 15 is connected across the two arms of the bridge for indicating the unbalance of the bridge in either direction and may be a galvanometer or any other equivalent electrical indicating instrument.

Means are provided for varying the resistance of the arms of the bridge to produce an unbalance thereof which comprise a conducting element 16 carried by the magnetic elements or compass needles 17 and rotatable therewith, said conducting element 16 being adapted to bridge the electrolytic paths between electrodes 9, 10 and 11 when in normal position as indicated in Fig. 1, thereby making the resistance of said paths a minimum and the resistance of one arm equal to that of the other. Compass needles 17 are held in parallel spaced relation by means of a bracket 18, which also serves as a pivoting means for said needles, and supported by a pivot member 19 which projects upward from the center of the bottom 20 of the container 7 (see Fig. 5). Carried by and attached to the ends of the magnetic needles 17 opposite the ends which carry the conducting member 16 is a balancing element 21 for maintaining the needles in a horizontal position.

A card 22, which, for example, may be circular to conform with the shape of the bowl or container 7, is attached to the bracket 18 and the needles 17 for reducing the oscillations of said needles in a vertical plane. The card may be marked with the cardinal points of the compass to serve as a compass rose if desired, and the container provided with a suitable lubber's mark, in which case the cover of the container may be made of some transparent material, such as glass, so that the card may be visible therethrough. Otherwise the cover may simply comprise a plate 23 secured to the container 7 by means of screws 24 as indicated in Fig. 4.

It will be apparent that the magnetic needles 17 will tend to remain in a north-south position relative to the earth's magnetic field so that the electrolytic paths between electrodes 9—10 and 10—11 remain substantially constant and hence the resistance thereof remains constant, but when relative angular movement takes place between the conducting element 16 carried by said needles and the electrodes 9, 10 and 11 carried by the container 7, the electrolytic paths will be varied and hence the resistances thereof will be varied. Accordingly, the variation of the resistances of said paths causes an unbalance of the bridge, thereby causing an indication on the meter 15, either to the left or to the right, depending upon the movement of the needles 17 being to the left or to the right relative to the container 7. When there is an angular displacement of conductor element 16 to the left, for example, which may be produced by moving the bowl 7 to the right, then the electrolytic path between electrodes 9 and 10 is decreased and electrolytic path between electrodes 10 and 11 is increased, thereby decreasing and increasing the resistances of said paths respectively. If, on the other hand, displacement of the conductor 16 is in the reverse direction, the electrolytic path of conductors 10 and 11 will be decreased and the path between electrodes 9 and 10 increased, thereby decreasing and increasing the resistances of said paths respectively. Therefore, if the compass bowl 7 be carried by a mobile object, such as a ship or aircraft, it will be seen that when the mobile object veers to the left the indicator 15 will give a "left" indication, and when it veers to the right, the indicator will give a "right" indication. By simultaneously increasing the resistance of one circuit and decreasing that of the other a greater difference in resistance between the two circuits is obtained and consequently a greater differential current is caused to flow through the indicating device resulting in truer indications and greater efficiency of the device.

There is thus provided novel means for indicating the deviation of a mobile object from a set path or course. Course-setting mechanism is also provided for predetermining and setting a selected course to be followed by the mobile object on which bowl 7 is mounted. As shown in Fig. 5, this mechanism includes a crank 25 connected to a bevel gear 26 so that the gear may be rotated thereby. A pinion 27 is arranged to mesh with the gear 26 to actuate a flexible shaft 28 which extends to the base 29 of the bowl 7 and is provided with a worm 30. The latter meshes with a worm wheel 31 carried by the base 29 of the rotatable bowl 7. Cooperating with the crank 25 is a stationary dial 32 attached to the bracket 33 adapted to be mounted on the instrument panel adjacent the indicating device 15, the latter being connected to the electrodes in the bowl and the resistances outside of the bowl, as hereinbefore explained. The front of the dial 32 is marked with the cardinal points of the compass and further subdivided into intermediate divisions representing degrees from zero to 360.

When it is desired, for example, to pilot the ship or aircraft carrying the apparatus on a set course, crank 25 is rotated to the marking on the dial 32 representing the desired course, which simultaneously rotates the bowl 7 by means of the flexible shaft 28. Rotation of bowl 7 will be indicated on the device 15 by means of its pointer, and now the mobile object may be steered to the selected course until the pointer is in the center of its scale, indicating that the ship or aircraft is on the course due to the balance produced on the bridge, as hereinbefore explained. Any deviation from said course will produce a corresponding deviation on the indicator 15.

In Fig. 2 is shown another form of the embodiment of the invention illustrated in Fig. 1, and the source 14 is placed between the arms of the bridge while the indicator 15 is connected to the ends of said arms. The operation is the same as that of the arrangement shown in Fig. 1.

In Fig. 3 is shown another embodiment, in which external resistances 12 and 13 are eliminated, and the indicating device operates by the flow of a differential current therein produced by relative movement between the conductor element 16 and electrodes 9, 10 and 11. To this end, indicator 15 is provided with a coil 34 having two equal and oppositely wound portions 35 and 36 which are carried by a suitable member 37 and adapted to be moved by reaction produced between their magnetic fields and a cooperating magnetic field of the device (not shown). Portions 35 and 36 are connected together at 38 and are energized from source 39, which may be a direct or alternating current source, through a coil spring 40. If alternating current be used then the cooperating field (not shown) of the device 15 must be produced by the same alternating current source or by an alternating current of the same frequency as that which flows through portions 35 and 36 in order that the field and the current in coil 34 may alternate together to produce a reaction. Portion 35 is then connected to a coil spring 41 and lead 42 to electrode 9, while the portion 36 is connected to a coil spring 43 and lead 44 through electrode 11, electrode 10 being connected to both portions through lead 45 and source 39. There is thus provided a pair of parallel circuits having a common source of electrical energy and one of which comprises electrodes 9 and 10 and portion 35 of the coil 34, while the other circuit includes electrodes 10 and 11 and portion 36.

It will be apparent that when conductor member 16 is in normal position (Fig. 1), electrolytic paths between electrodes 9 and 10 and electrodes 10 and 11 are substantially equal and equal currents are flowing through portions 35 and 36. Since said portions are wound in opposite directions, their magnetic fields are neutralized, and no reaction is produced, but when relative angular movement takes place between conductor element 16 carried by the magnetic needles 17 and electrodes 9, 10 and 11 carried by the container 7, the paths will be varied, and more or less current will flow through one portion than through the other, depending on which path is increased or decreased, thereby causing unequal currents to flow through the coil 34, and producing a reaction between its field and the cooperating field of the device 15. The pointer 46 will then move to the left or the right, depending on which current predominates, in accordance with relative movement of the container 7 being to the left or to the right. As in Fig. 1 the simultaneous increase of the resistance of the circuit including portion 35 and decrease of the resistance of the circuit including portion 36, or vice versa, produces a greater difference in the opposed currents flowing in coil 34 and consequently a greater differential field to produce a reaction against the cooperating field (not shown) of the indicator 15. It is obvious that with a stronger field to work with, the indicator will operate more efficiently and truer indications will be obtained thereby rendering the apparatus more sensitive.

In Fig. 3ᵃ is shown an alternative of the embodiment shown in Fig. 3, wherein the indicating device 15 is replaced by a two-way relay having an armature 47 which is adapted to be actuated to close contacts 48 and 49 or 50 and 51, depending on whether coil 36 or 35 has the greater current flowing therethrough, as explained in connection with Fig. 3. Contacts 48 and 49 and 50 and 51 may be arranged to close the circuit of a reversible motor 52 and the latter may be utilized to actuate a repeater compass card for indicating, at a remote point, deviation of a mobile object, as hereinbefore explained, and may also be used as a follow-up motor for rotating the compass bowl, as is done when a follow-up system is used.

From the foregoing description it will be seen that there is disclosed a novel method of indicating differences in the relative angular position between a directional device and a mobile object on which said device is mounted. It will also be seen that novel means are provided in combination with a magnetic compass for accurately and effectively repeating relative angular movements between a mobile object and directional elements of the compass, thereby enabling the pilot or navigator of said mobile object, which may be a ship or aircraft, to quickly perceive at a point or points, which may, if desired, be located at a distance from the compass, whether he is on or off his course and to pilot the craft accordingly. The device is quite simple, easily constructed thereby reducing the cost of manufacture, and yet is rugged enough to withstand hard use under the trying conditions generally encountered in aerial navigation, for example, without sacrificing or decreasing the efficiency of the device. It is also unaffected by any voltage variations which may prevail in the source of current supply. The magnetic compass may be mounted in any convenient location on a ship or aircraft, while the indicator or repeater which is operated thereby may be conveniently mounted on the instrument panel in the cockpit of an aircraft or on the bridge of a vessel, etc. Various changes and modifications may be made in the apparatus without departing from the scope of the invention, and reference will be had, therefore, to the appended claim for a definition of the limits of the invention.

What is claimed is:

In electrical apparatus of the class described, a container having an electrolyte therein, three fixed electrodes mounted in said container on the same side thereof and in contact with said electrolyte and closely adjacent one another, said electrodes being spaced apart to form two electrolytic paths therebetween, a magnetic element rotatably mounted in said container, and a segmental electrode carried by said magnetic element and movable therewith relative to said fixed electrodes in response to the earth's magnetic field, said movable electrode being positioned adjacent said fixed electrodes and of an arcuate length to normally completely bridge said paths and the center fixed electrode whereby the electrical resistance of one of said paths is increased and that of the other simultaneously decreased upon relative angular movement of said movable electrode.

ADOLF URFER.